(12) United States Patent
Son et al.

(10) Patent No.: US 7,758,662 B2
(45) Date of Patent: Jul. 20, 2010

(54) REFORMER FOR FUEL CELL SYSTEM AND FUEL CELL SYSTEM HAVING THE SAME

(75) Inventors: In-Hyuk Son, Suwon-si (KR); Zin Park, Suwon-si (KR); Dong-Myung Suh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1157 days.

(21) Appl. No.: 11/365,107

(22) Filed: Feb. 28, 2006

(65) Prior Publication Data

US 2006/0194085 A1    Aug. 31, 2006

(30) Foreign Application Priority Data

Feb. 28, 2005    (KR) .................... 10-2005-0016509

(51) Int. Cl.
*B01J 7/00* (2006.01)
(52) U.S. Cl. .................. 48/61; 48/75; 48/63; 48/93; 48/94; 48/127.9; 422/198; 422/200; 422/211; 422/212; 422/188; 422/189; 422/190; 422/191; 422/192; 422/193; 422/201; 422/202; 422/204; 422/222; 165/145
(58) Field of Classification Search ............... 422/200, 422/187–188, 190–193, 196; 429/19, 20
See application file for complete search history.

(56) References Cited

U.S. PATENT DOCUMENTS

| 2,507,293 | A | * | 5/1950 | Arant | 122/250 R |
|---|---|---|---|---|---|
| 5,155,085 | A | * | 10/1992 | Hamano et al. | 502/303 |
| 7,481,856 | B2 | * | 1/2009 | Docter et al. | 48/61 |
| 2006/0045828 | A1 | * | 3/2006 | Aaron et al. | 422/196 |

FOREIGN PATENT DOCUMENTS

| JP | 2001-89103 A | 4/2001 |
|---|---|---|
| JP | 2002-356306 A | 12/2002 |
| JP | 2004-267884 A | 9/2004 |
| JP | 2005-43186 A | 2/2005 |
| JP | 2006-19295 A | 1/2006 |

* cited by examiner

*Primary Examiner*—Alexa D. Neckel
*Assistant Examiner*—Kaity V. Handal
(74) *Attorney, Agent, or Firm*—Christie, Parker & Hale, LLP (57) ABSTRACT

A reformer includes a burner that generates thermal energy, and a reforming reaction unit that is supplied with thermal energy from the burner to generate a hydrogen-rich gas from a fuel, wherein the burner includes a burner main body having first and second portions that are constructed by bending the burner main body to form bended portions and coupling the bended portions together, wherein the burner main body is disposed in an inner portion of the reforming reaction unit, and wherein a first catalyst is filled in an inner portion of the burner main body.

15 Claims, 4 Drawing Sheets

REFORMER FOR FUEL CELL SYSTEM AND FUEL CELL SYSTEM HAVING THE SAME

CROSS-REFERENCE TO RELATED APPLICATION

This application claims priority to and the benefit of Korean Patent Application No. 10-2005-0016509, filed in the Korean Intellectual Property Office on Feb. 28, 2005, the entire content of which is incorporated herein by reference.

BACKGROUND OF THE INVENTION (a) Field of the Invention

The present invention relates to a fuel cell system, and more particularly, to a reformer burner and a reformer using the same.

(b) Description of the Related Art

As is well known, a fuel cell is an electricity generating system for directly converting chemical reaction energy of oxygen and hydrogen contained in a fuel of a hydrocarbon material, such as methanol, ethanol, and natural gas, into electrical energy.

According to types of electrolyte used for the fuel cells, the fuel cells can be classified into phosphate fuel cells, molten carbonate fuel cells, solid-sate oxide fuel cells, polymer electrolyte fuel cells, and alkali fuel cells. These fuel cells are all operated on about the same principle, but are different from each other in terms of fuel types, operating temperatures, catalysts, electrolytes, and the like.

A polymer electrolyte membrane fuel cell (PEMFC) has been recently developed to have excellent output characteristics, low operation temperature, and fast starting and response characteristics in comparison with the other types of fuel cells. In addition, the PEMFC advantageously has a wide range of applications including a mobile power source for vehicles, a distributed power source for homes or buildings, and a small-size power source for electronic apparatuses.

The PEMFC system includes a stack, a reformer, a fuel tank, and a fuel pump. The stack constitutes a main body of the fuel cell, and the fuel pump supplies the fuel in the fuel tank to the reformer. The reformer reforms the fuel to generate a reforming gas including hydrogen and supplies the reforming gas to the stack.

In the stack, an electro-chemical reaction of the hydrogen supplied from the reformer and oxygen separately supplied to the stack occurs, so that electrical energy is generated.

In the fuel cell system having the aforementioned construction, the reformer generates the hydrogen from the fuel through a chemical catalytic reaction using thermal energy. The reformer includes a burner for generating the thermal energy and a reforming reaction unit for generating the hydrogen gas through the reforming catalytic reaction using the thermal energy. The burner has a structure for generating the thermal energy through an oxidation reaction of the fuel and the air by using an oxidation catalyst in the main body.

In a conventional reformer, the burner and the reforming reaction unit are disposed in a distributed manner to transfer the thermal energy generated from the burner to the reforming reaction unit. Therefore, in the conventional reformer, a thermal (or heat) transfer between the burner and the reforming reaction unit is needed to be performed. As a result, there is a problem in that a reaction starting time of the reforming reaction unit is delayed. In addition, there is another problem in that a performance and a reaction efficiency of the reformer deteriorate due to a temperature gradient from the burner to the reforming reaction unit.

SUMMARY OF THE INVENTION

The present invention provides a reformer for a fuel cell system capable of improving a thermal transfer performance of a burner to a reforming reaction unit and a fuel cell system having the reformer.

According to one embodiment of the present invention, the reformer includes a burner adapted to generate thermal energy; and a reforming reaction unit adapted to be supplied with the thermal energy from the burner to generate a hydrogen-rich gas from a fuel, wherein the burner includes a burner main body having first and second portions formed by bending the burner main body to form bended portions and coupling the bended portions together, wherein the burner main body is disposed in an inner portion of the reforming reaction unit, and wherein a first catalyst is filled in an inner portion of the burner main body.

In the above embodiment, the reforming reaction unit may include a reformer main body and a second catalyst filled in an inner potion of the reformer main body.

In addition, the reformer main body may have a cylindrical shape, a first end, and a second end, the first end and the second end being substantially closed, a reformer inlet may be provided at the first end of the reformer main body, and a first outlet may be provided at the second end of the reformer main body.

A burner inlet may be provided to the first portion of the burner main body, and a burner outlet may be provided to the second portion of the burner main body.

The burner main body may have a coil shape wound in a helical configuration.

The first catalyst may have a pellet shape.

According to another embodiment of the present invention, there is provided a fuel cell system including an electricity generator adapted to generate electrical energy through a reaction of hydrogen and oxygen; a reformer adapted to generate a hydrogen-rich gas from a fuel through a catalytic reaction using thermal energy and to supply the hydrogen-rich gas to the electricity generator; a fuel supplying unit adapted to supply the fuel to the reformer; and an oxygen supply unit adapted to supply the oxygen to the reformer and the electricity generator, wherein the reformer includes a reforming reaction portion having a reformer main body filled with a second catalyst and a burner main body having first and second portions formed by bending the burner main body to form bended portions and coupling the bended portions together, the burner main body being filled with a first catalyst, wherein the burner main body is disposed in an inner portion of the reforming reaction unit.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
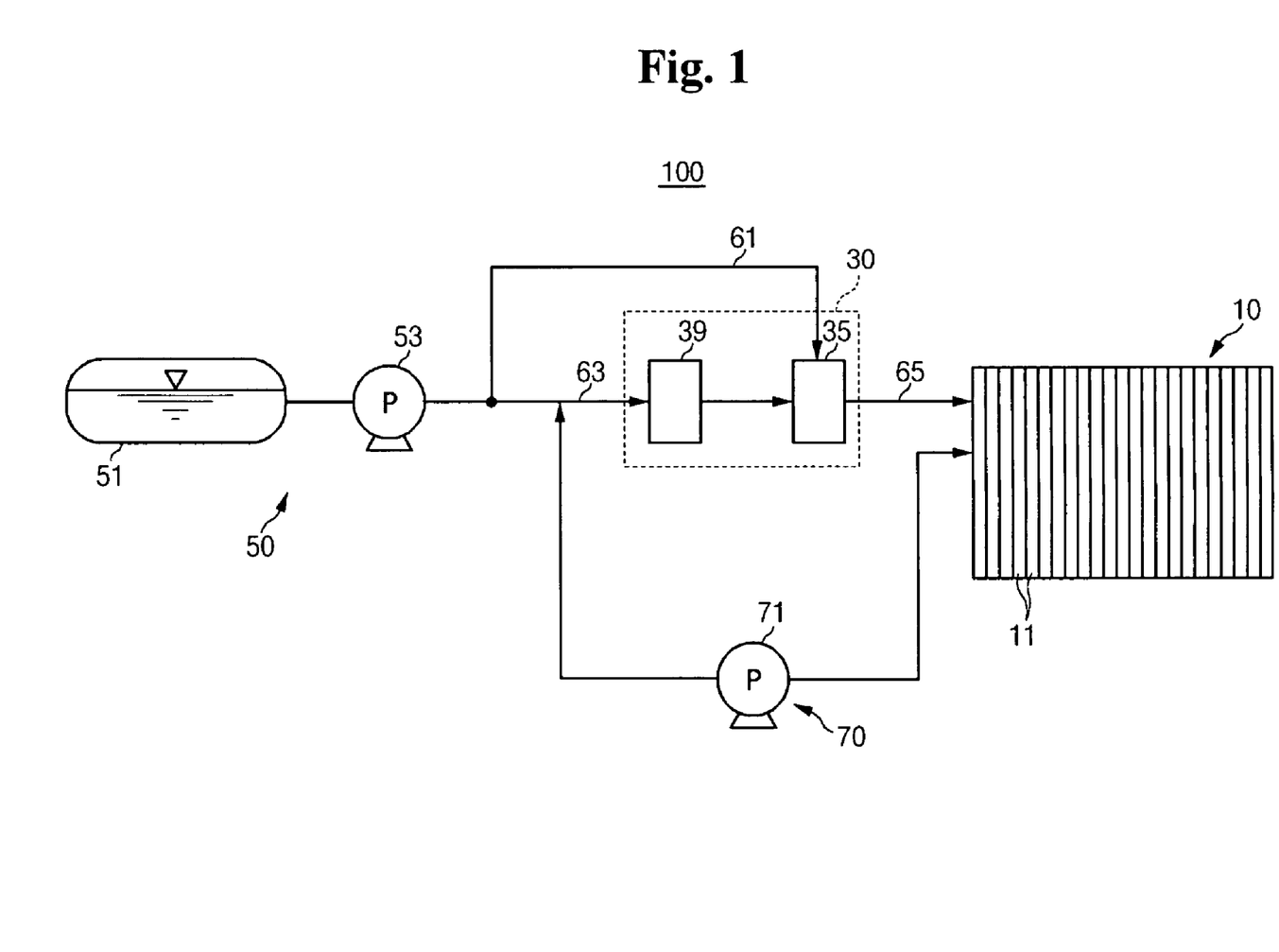
FIG. 1 is a schematic block diagram showing an entire construction of a fuel cell system according to embodiments of the present invention.

FIG. 1 is a schematic block diagram illustrating an entire construction of a fuel cell system 100 according to embodiments of the present invention.

Referring to FIG. 1, the fuel cell system 100 employs a polymer electrolyte membrane fuel cell (PEMFC) that generates hydrogen by reforming a fuel and generates electrical energy through an electrochemical reaction of the hydrogen and an oxidant gas.

In the fuel cell system 100, the fuel used to generate the hydrogen can be a liquid or a gas fuel containing hydrogen such as methanol, ethanol, and natural gas. Hereinafter, a liquid fuel is exemplified, and abbreviated to be referred to as a fuel for the convenience of description.

In the fuel cell system 100, the oxidant gas reacting with the hydrogen may be oxygen stored in a separate storage mechanism or air containing oxygen. Hereinafter, the latter is exemplified.

The fuel cell system 100 of FIG. 1 includes a stack 10 that generates electrical energy through an electrochemical reaction of hydrogen and oxygen, a reformer 30 that generates a reforming gas (or a hydrogen-rich gas) from the aforementioned fuel by using thermal energy and supplies the hydrogen-rich gas (or hydrogen) to the stack 10, a fuel supply unit 50 that supplies the fuel to the reformer 30, and an oxygen supply unit 70 that supplies the oxygen to the reformer 30 and the stack 10.

Figure 2:
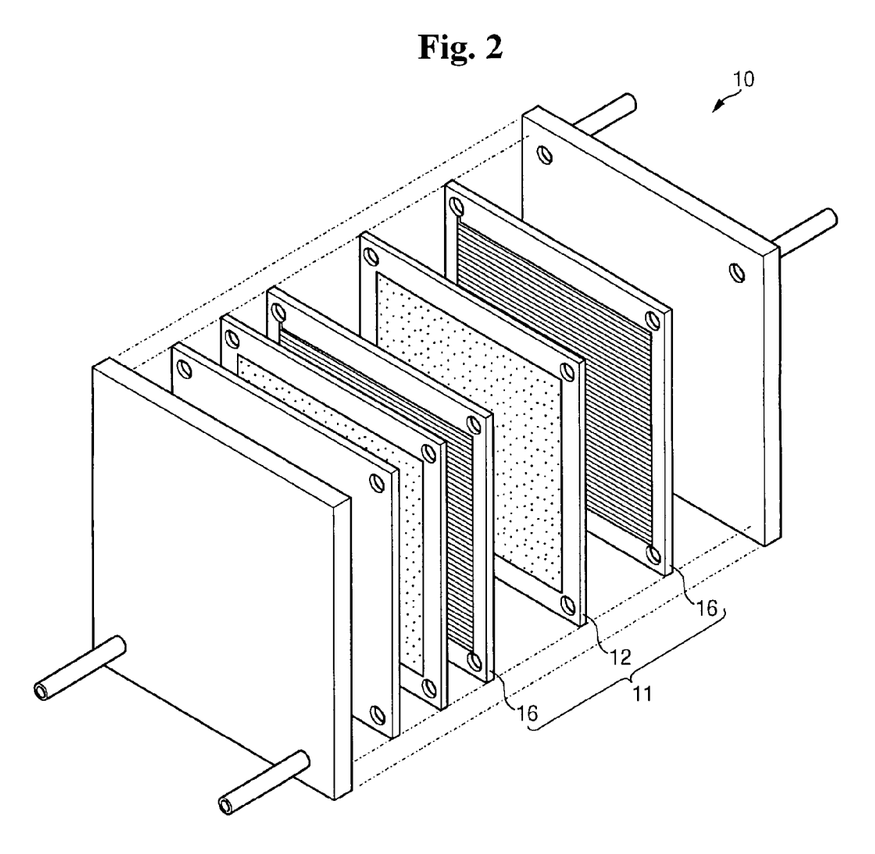
FIG. 2 is an exploded perspective view showing a structure of a stack shown in FIG. 1.

FIG. 2 is an exploded perspective view showing a structure of the stack 10 shown in FIG. 1. The stack 10 employed by embodiments of the present invention includes an electricity generator 11, which is constructed with a membrane electrode assembly 12 and separators 16 (referred to as "bipolar plates") closely attached to both sides of the membrane electrode assembly 12.

The stack 10 of the fuel cell system 100 may be constructed by sequentially disposing (or stacking) a plurality of electricity generators 11 adjacent to one another. Since the stack 10 can be constructed to be a stack of a known polymer electrolyte membrane fuel cell, a detailed description thereof will be omitted.

The reformer 30 generates a hydrogen-rich gas from the fuel containing hydrogen through chemical catalytic reactions of the fuel by using thermal energy, for example, a steam reforming reaction, or a partial oxidation reaction, and supplies the hydrogen to the stack 10. The structure of the reformer 30 will be described later in more detail with reference to FIGS. 3 and 4.

The fuel supply unit 50 includes a fuel tank 51 that stores the fuel and a fuel pump 53 that is connected to the fuel tank 51 and discharges the fuel from the fuel tank 51. The fuel pump 53 may be connected through a pipeline 61 and pipeline 63 to a reforming reaction unit 35 and a burner 39, respectively, which will be described later in more detail.

The oxygen supply unit 70 includes an air pump 71 that pumps air and supplies the air to the electricity generator 11 of the stack 10 and the burner 39 with a predetermined pumping pressure. In the embodiment, as shown in FIG. 1, the oxygen supply unit 70 has a structure for supplying air to the stack 10 and the burner 39 by the use of a single air pump 71; however, the present invention is not limited to the aforementioned structure, and the oxygen supply unit 70 may have a pair of air pumps that are connected to the stack 10 and the burner 39, respectively.

During the operation of the fuel cell system 100 having the aforementioned structure, when the hydrogen generated from the reformer 30 and the air are supplied to the electricity generator 11 of the stack 10, the stack 10 generates a predetermined output of electrical energy and water through an electrochemical reaction of the hydrogen and the oxygen.

The fuel cell system 100 uses a general control unit (not shown) to control how the fuel cell system 100 is driven, for example, to control the driving of the fuel supply unit 50, the oxygen supply unit 70, and the like.

The reformer 30 will be described in more detail with reference to FIGS. 3 and 4.

Figure 3:
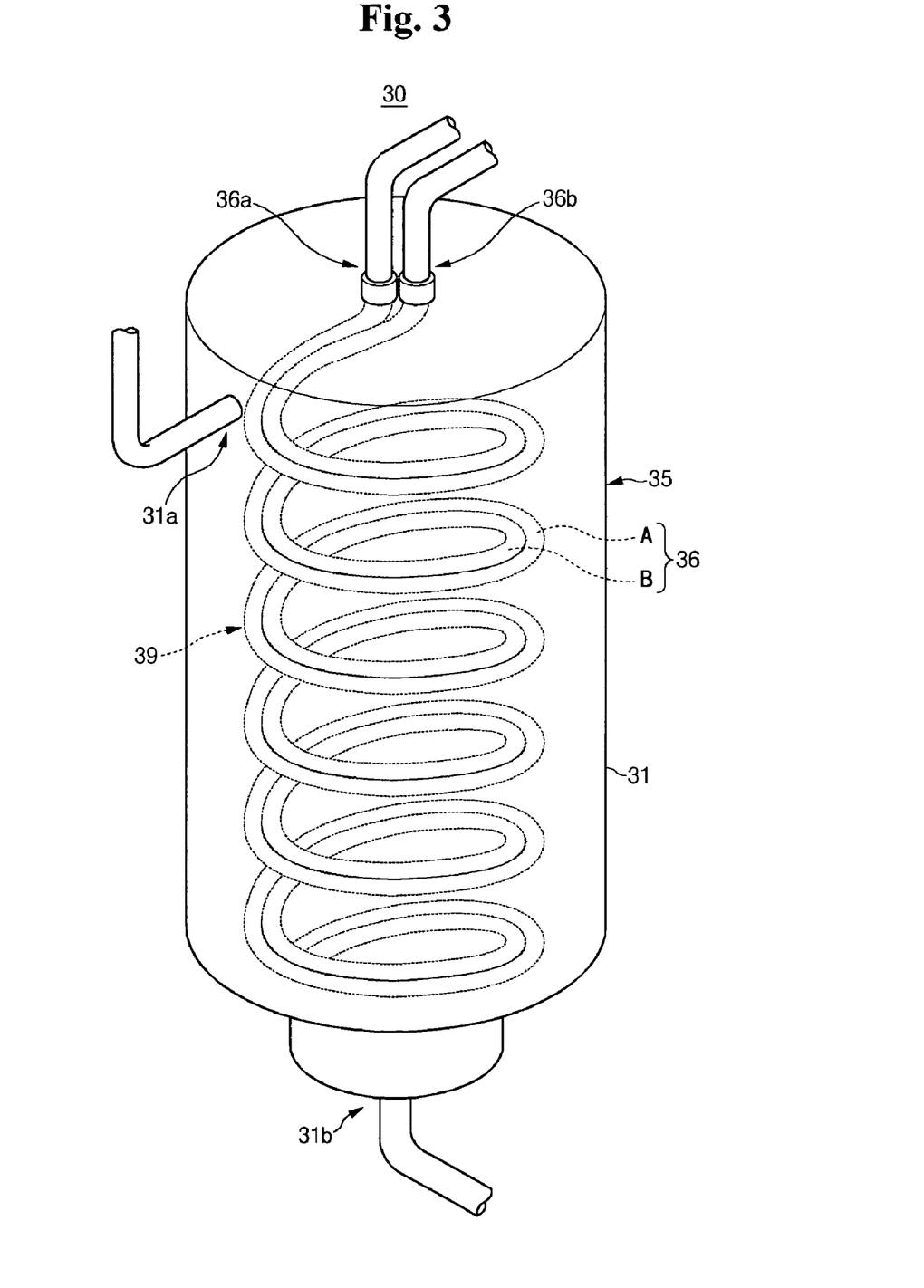
FIG. 3 is a schematic perspective view showing a structure of a reformer according to an embodiment of the present invention.
Figure 4:
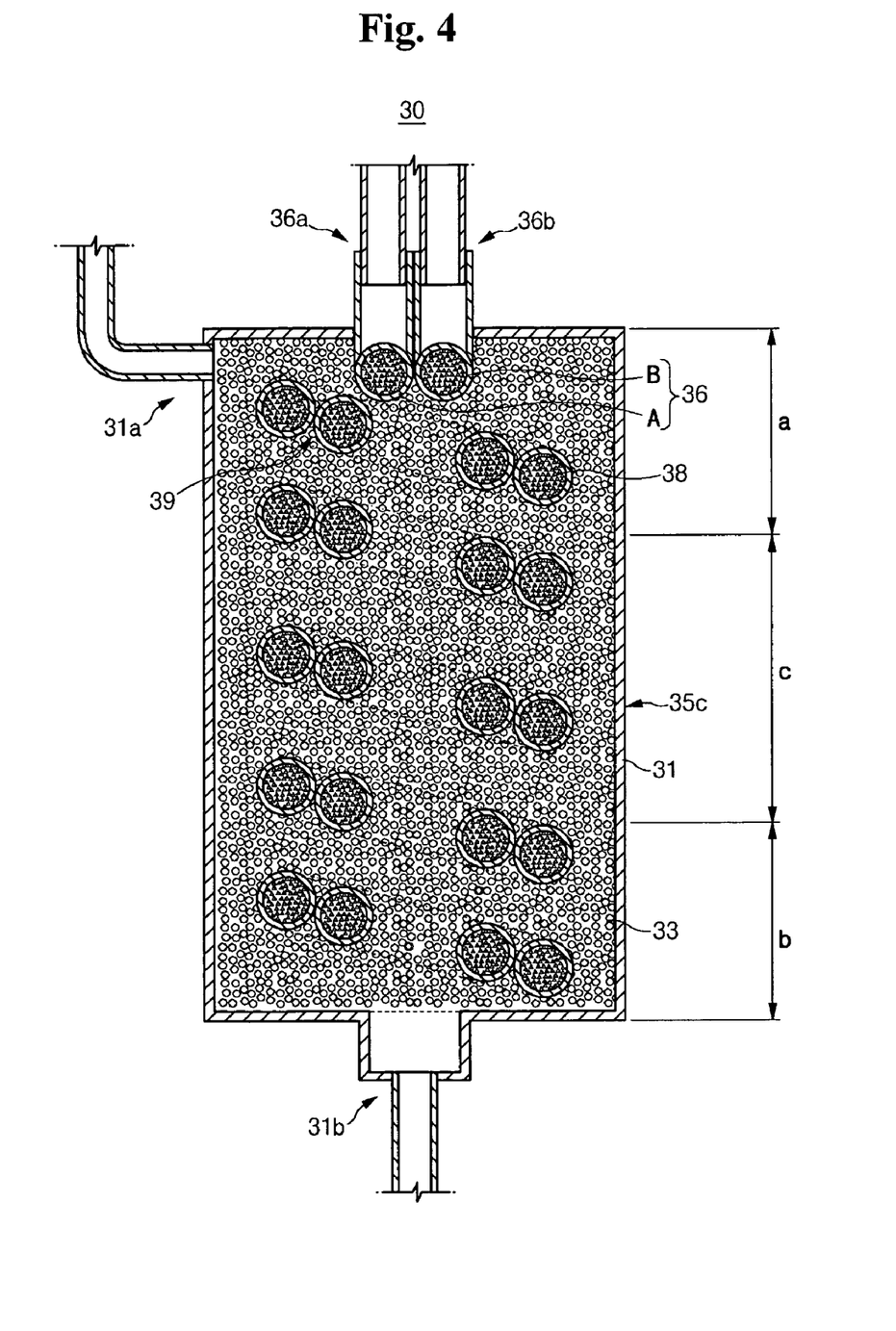
FIG. 4 is a cross-sectional view of FIG. 3.

FIG. 3 is a schematic perspective view showing a structure of the reformer 30 according to an embodiment of the present invention, and FIG. 4 is a cross-sectional view of FIG. 3.

Referring to FIGS. 3 and 4, the reformer 30 includes a reforming reaction unit 35, which generates the hydrogen from the fuel through a reforming catalytic reaction using thermal energy, and a burner 39 that generates the thermal energy through an oxidation catalytic reaction of the fuel and the air.

According to the embodiment, the reforming reaction unit 35 includes a main body 31 that has an inner space filled with a reforming catalyst 33.

In the embodiment, the main body 31 has a cylindrical shape (e.g., a shape of a pipe) having a predetermined cross-sectional area, and two ends, which are substantially closed.

Since the main body 31 is an exposed portion, the main body 31 may be made of a heat-isolating metal or a non-metal.

A first inlet (or a reformer inlet) 31a, which is used to inject the fuel supplied from the fuel tank 51 into the inner space, is provided at one end of the main body 31, and a first outlet (or a reformer outlet) 31b, which is used to discharge the hydrogen generated through the fuel reforming reaction using the reforming catalyst 33, is provided at the other end of the main body 31.

Referring also to FIG. 1, the first inlet 31a is connected to the fuel pump 53 through the pipeline 61, and the first outlet 31b is connected to the electricity generator 11 of the stack 10 through a pipeline 65.

The reforming catalyst 33 in the reforming reaction unit 35 has a function of facilitating the fuel reforming reaction by absorbing heat generated from the burner 39. The reforming catalyst 33 may have a structure in which a catalytic material, such as copper (Cu), nickel (Ni), and/or platinum (Pt), is contained in a pellet-shaped carrier made of alumina ($Al_2O_3$), silica ($SiO_2$), and/or titania ($TiO_2$).

In the embodiment, the burner 39 that generates the thermal energy is disposed in an inner portion of the main body 31. The burner 39 has a burner main body 36 which has a predetermined inner space filled with an oxidation catalyst 38.

The burner main body 36 may be shaped as a pipe having a predetermined cross-sectional area and two ends, which are substantially closed. The burner main body 36 is buried in the reforming catalyst 33.

The burner main body 36 may be made of a metal having a thermal conductivity that can easily transfer the thermal energy generated through the oxidation reaction of the fuel and the oxygen using the oxidation catalyst 38 to the reforming reaction unit 35.

In addition, a second inlet (or burner inlet) 36a that is used to inject the fuel supplied from the fuel tank 51 and the air supplied by the air pump 71 into the inner space of the burner main body 36 is provided at one end of the burner main body 36, and a second outlet (or a burner outlet) 36b, which is used to discharge a combustion gas generated from the oxidation reaction of the fuel and the air using the oxidation catalyst 38, is provided at the other end of the burner main body 36.

As shown, the second inlet and outlet 36a and 36b are designed to pass through at around the same end of the main body 31 and to be led out to the exterior thereof. The second inlet 36a is connected to the fuel pump 53 and the air pump 71 through the pipeline 63.

In the embodiment, the pipeline 63 is shaped as a confluence pipe for supplying the fuel and the air. As shown in the FIGS. 3 and 4, the second inlet 36a has a single hole through which the fuel supplied from the fuel tank 51 and the air supplied by the air pump 71 are injected.

In the burner 39, the inner space of the burner main body 36 is filled with the oxidation catalyst 38. The oxidation catalyst 38 has a function of oxidizing and burning the fuel and the air to generate the thermal energy having a temperature ranging from 200° C. to 300° C. required for the reforming reaction of the reforming reaction unit 35. The oxidation catalyst 38 has a structure in which a catalytic material such as platinum (Pt) and/or ruthenium (Ru) is contained in a pellet-shaped carrier made of alumina ($Al_2O_3$), silica ($SiO_2$), and/or titania ($TiO_2$).

The burner main body 36 is provided with first and second portions A and B which are constructed by bending a straight pipe at a mid-portion thereof between two ends (to form bended portions) and coupling (or contacting) the bended portions together.

Here, the open end of the first portion A of the burner main body 36 becomes the aforementioned second inlet 36a, and the open end of the second portion B of the burner main body 36 becomes the aforementioned second outlet 36b. In the structure of the burner main body 36, the second inlet and outlet 36a and 36b pass through a side end portion of the main body 31 (where the first inlet 31a is provided) and are led out to the exterior thereof.

As shown in FIGS. 3 and 4, the burner 39 having such a structure (e.g., a coil structure) is provided in order to reduce a temperature gradient of the thermal energy generated from the burner 39 and to supply the thermal energy having a uniform temperature distribution to the entire region of the reforming reaction unit 35. In the embodiment, the reforming reaction unit 35 is partitioned into a first region a where the first inlet 31a of the main body 31 is provided, a second region b where the first outlet 31b is provided, and a third region c which is a region between the first and second regions corresponding to the first inlet and outlet 31a and 31b.

A relation between the structure of the burner main body 36 and the temperature gradient will now be described in more detail below. Unlike the burner main body 36 according to the embodiment of the present invention which is constructed by bending a straight pipe, a conventional burner is constructed to be a straight pipeline.

In the conventional case, in an injecting region (corresponding to the first region of the reforming reaction unit) where the fuel and the air are injected, the non-preheated fuel and air are injected, so that the thermal energy generated in the injecting region produces a low temperature increase. In a discharging region (corresponding to the second region of the reforming reaction unit) where the combustion gas of the fuel and air is discharged, a concentration of the fuel and air passing through the oxidation catalyst is gradually reduced, so that the thermal energy generated from the discharging region also produces a low temperature increase that may be even lower than the injecting region where the fuel and air are injected. In an intermediate region (corresponding to the third region of the reforming reaction unit) between the injecting region and the discharge region, the fuel and air are maximally pre-heated, and the concentration of the fuel and air is relatively high, so that the thermal energy generated from the intermediate region produces a high temperature increase that is higher than the discharging region where the fuel and air are discharged.

As described above, in the burner 39 according to the embodiment of the present invention, the burner main body 36 is provided with the first and second portions A and B.

Therefore, the temperature gradient of the burner 39 through the regions a, b, and c of the reforming reaction unit 35 is reduced, so that it is possible to transfer a substantially uniform thermal energy producing a substantially uniform temperature to the regions a, b, and c.

That is, in the burner main body 36 according to the embodiment, the thermal energy generated from the region corresponding to the third region c of the reforming reaction unit 35 is suitably distributed to the regions corresponding to the first and second regions a and b of the reforming reaction unit 35, so that it is possible to reduce a temperature variation over the burner 39.

In addition, the burner main body 36 according to the embodiment has a coil shape wound in a helical configuration (or is constructed by helically winding the first and second portions A and B constructed by bending a straight pipe at a mid-portion thereof between two ends and coupling the bended portions together). That is, in the burner main body 36, a passage of the fuel and air, which pass from the second inlet 36a through the first and second portions A and B, may be constructed to have a double-helical shape.

According to the embodiment, since the fuel and air pass through the double-helical passage in the burner main body 36, the length of the passage of the fuel and air can increase, and the contact area of the reforming catalyst 33 to the burner main body 36 can be further increased.

Operations of the fuel cell system having the aforementioned structure according to the embodiment will be described in more detail below.

Initially, the fuel pump 53 is driven to discharge the fuel stored in the fuel tank 51 and supply the fuel to the inner portion of the burner main body 36 through the second inlet 36a thereof.

In addition, the air pump 71 is driven to supply the air in the inner portion of the burner main body 36 through the second inlet 36a thereof.

Since the burner main body 36 has a shape of a coil that is constructed by helically winding the first and second portions A and B constructed by bending a straight pipe at a mid-portion thereof between two ends and coupling (or contacting) the bended portions together, the fuel and air passing through the double-helical passage of the first and second portions A and B are subject to an oxidation reaction by the oxidation catalyst 38.

Accordingly, the contact area of the fuel and air to the oxidation catalyst 38 is further increased due to the double-helical passage, so that it is possible to improve an efficiency of the reaction of the fuel and air using the oxidation catalyst 38.

In addition, in the burner 39, the fuel and air are burned through the oxidation catalytic reaction to generate the thermal energy having a predetermined temperature range, for example, a temperature ranging from 200° C. to 300° C, required for the reforming reaction of the reforming reaction unit 35. The generated thermal energy is dispersed to the reforming catalyst 33 of the reforming reaction unit 35 through the burner main body 36. Accordingly, the reforming catalyst 33 is heated with the thermal energy having a predetermined reaction starting temperature range from the burner 39. The combustion gas generated in the inner portion of the burner main body 36 is discharged through the second outlet 36b to the exterior of the burner main body 36.

Since the burner main body 36 of the burner 39 has the first and second portions A and B, which are constructed by bending a straight pipe at a mid-portion thereof between two ends and coupling (or contacting) the bended portions together, the thermal energy having the highest temperature generated from the region corresponding to the third region c of the reforming reaction unit 35 is suitably distributed to the regions corresponding to the first and second regions a and b of the reforming reaction unit 35, so that it is possible to reduce a temperature variation over the burner 39.

Accordingly, the temperature gradient from the burner 39 to the reforming reaction unit 35 is reduced, so that it is possible to transfer thermal energy having a uniform temperature to the regions a, b, and c.

In this state, the fuel pump 53 is driven to supply the fuel stored in the fuel tank 51 to the first inlet 31a of the main body 31 of the reforming reaction unit 35. The fuel passing through the reforming catalyst 33 in the inner portion of the main body 31 of the reforming reaction unit 35 is subject to the reforming reaction, and in the reforming reaction unit 35, a decomposition reaction (endothermic reaction) of the fuel using the reforming catalyst 33 proceeds, so that the reforming gas containing the hydrogen is generated.

As described above, since the burner main body 36 having the first and second portions A and B, which are constructed by bending a straight pipe at a mid-portion thereof between two ends and coupling (or contacting) the bended portions together, is buried in the reforming catalyst 33, the contact area of the reforming catalyst 33 to the burner main body 36 is further increased, so that it is possible to further improve an efficiency of the reforming reaction of the fuel using the reforming catalyst 33.

Also, the reforming gas is supplied to the electricity generator 11 of the stack 10 through the first outlet 31b of the main body 31 of the reforming reaction unit 35 to generate the electrical energy. The electrical energy is used as a power source for driving a predetermined load, for example, portable electronic apparatuses such as notebooks, PDAs, and/or mobile communication terminals.

According to the embodiments of the present invention, a burner includes a burner main body, which has first and second portions constructed by bending a straight pipe at a mid-portion thereof between two ends and then coupling (or contacting) the bended portions together, buried in a reforming catalyst, so that it is possible to improve a thermal transfer efficiency of the burner to the reforming reaction unit and an entire performance of a reformer.

In addition, a contact area of fuel and air to an oxidation catalyst and a contact area of a reforming catalyst to a burner main body increase, so that it is possible to improve a reaction efficiency and an entire performance of a reformer.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer comprising:
a burner adapted to generate thermal energy; and
a reforming reaction unit adapted to be supplied with the thermal energy from the burner to generate a hydrogen-rich gas from a fuel,
wherein the burner comprises:
a burner main body having first and second portions separated by a bend and coupled together, wherein the first and second portions are in contact with one another, and wherein the burner main body is disposed in an inner portion of the reforming reaction unit; and
a first catalyst filled in an inner portion of the burner main body.

2. The reformer of claim 1, wherein the reforming reaction unit comprises:
a reformer main body; and
a second catalyst filled in an inner potion of the reformer main body.

3. The reformer of claim 2,
wherein the reformer main body has a cylindrical shape, a first end, and a second end, the first end and the second end being substantially closed,
wherein a reformer inlet is provided at the first end of the reformer main body, and
wherein a reformer outlet is provided at the second end of the reformer main body.

4. The reformer of claim 1,
wherein a burner inlet is provided to the first portion of the burner main body, and
wherein a burner outlet is provided to the second portion of the burner main body.

5. The reformer of claim 1, wherein the burner main body has a coil shape wound in a helical configuration.

6. The reformer of claim 1, wherein the first catalyst has a pellet shape.

7. A fuel cell system comprising:
an electricity generator adapted to generate electrical energy through a reaction of hydrogen and oxygen;
a reformer adapted to generate a hydrogen-rich gas from a fuel through a catalytic reaction using thermal energy and to supply the hydrogen-rich gas to the electricity generator;
a fuel supplying unit adapted to supply the fuel to the reformer; and
an oxygen supply unit adapted to supply the oxygen to the reformer and the electricity generator,
wherein the reformer comprises:
a reforming reaction unit having a reformer main body filled with a second catalyst; and
a burner main body having first and second portions separated by a bend and coupled together, wherein the first and second portions are in contact with one another, body to form bended portions and coupling the bended portions together, the burner main body being filled with a first catalyst, wherein the burner main body is disposed in an inner portion of the reforming reaction unit.

8. The fuel cell system of claim 7, wherein the burner main body has a coil shape wound in a helical configuration.

9. The fuel cell system of claim 7, wherein the fuel supply unit comprises:
a fuel tank adapted to store the fuel; and
at least one fuel pump connected to the fuel tank and adapted to discharge the fuel.

10. The fuel cell system of claim 7, wherein the oxygen supply unit has at least one air pump adapted to pump and supply the air to the reformer and the electricity generator.

11. The fuel cell system of claim 7, wherein a plurality of electricity generators are stacked adjacent to one another to constitute a stack of the fuel cell system.

12. A burner for a fuel cell reformer having a reforming reaction unit, the burner comprising:
  a burner main body having first and second portions; and
  an oxidation catalyst filled in the first and second portions of the burner main body,
  wherein the first and second portions of the burner main body are formed by bending a straight pipe at a mid-portion thereof to couple the first and second portions together, such that the first and second portions are in contact with one another together, and
  wherein the burner main body is disposed in an inner portion of the reforming reaction unit.

13. The burner of claim 12,
  wherein an inlet is provided to the first portion of the burner main body, and
  wherein an outlet is provided to the second portion of the burner main body.

14. The burner of claim 12, wherein the burner main body has a coil shape wound in a helical configuration.

15. The reformer of claim 12, wherein the oxidation catalyst has a pellet shape.

* * * * *

UNITED STATES PATENT AND TRADEMARK OFFICE
CERTIFICATE OF CORRECTION

PATENT NO. : 7,758,662 B2
APPLICATION NO. : 11/365107
DATED : July 20, 2010
INVENTOR(S) : In-Hyuk Son et al.

It is certified that error appears in the above-identified patent and that said Letters Patent is hereby corrected as shown below:

In the Claims

Column 8, Claim 7, lines 55 and 56    Delete "body to form bended portions and coupling the bended portions together,"

Column 10, Claim 12, line 2    After "another"
Delete "together"

Signed and Sealed this
Fifteenth Day of November, 2011

David J. Kappos
*Director of the United States Patent and Trademark Office*